(12) United States Patent
Hutchinson, IV

(10) Patent No.: US 7,197,124 B2
(45) Date of Patent: Mar. 27, 2007

(54) IN-BOUND CALL DIRECTED TELEPHONE STATION AND METHOD OF DIRECTING A TELEPHONE STATION BASED ON AN IN-BOUND CALL

(75) Inventor: James A. Hutchinson, IV, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 223 days.

(21) Appl. No.: 10/170,270

(22) Filed: Jun. 10, 2002

(65) Prior Publication Data

US 2003/0138090 A1 Jul. 24, 2003

Related U.S. Application Data

(60) Provisional application No. 60/350,059, filed on Jan. 18, 2002.

(51) Int. Cl.
*H04M 3/42* (2006.01)
(52) U.S. Cl. ............... 379/201.01; 379/387.01; 455/415; 455/417
(58) Field of Classification Search ........... 379/201.01, 379/387.01; 455/415, 417
See application file for complete search history.

(56) References Cited

U.S. PATENT DOCUMENTS

| | | | | |
|---|---|---|---|---|
| 4,086,438 A | * | 4/1978 | Kahn et al. .................. | 379/158 |
| 5,077,789 A | * | 12/1991 | Clark et al. ............ | 379/211.02 |
| 5,608,782 A | * | 3/1997 | Carlsen et al. .............. | 455/461 |
| 5,680,447 A | | 10/1997 | Diamond et al. ...... | 379/142.01 |
| 5,862,208 A | * | 1/1999 | MeLampy et al. ..... | 379/212.01 |
| 5,883,964 A | * | 3/1999 | Alleman ................ | 379/205.01 |
| 5,907,604 A | | 5/1999 | Hsu ....................... | 379/142.06 |
| 6,314,282 B1 | * | 11/2001 | Weber et al. ............ | 455/404.2 |

FOREIGN PATENT DOCUMENTS

| | | |
|---|---|---|
| EP | 0825751 | 8/1997 |
| WO | 9925107 | 5/1999 |

\* cited by examiner

*Primary Examiner*—Quynh H. Nguyen
(74) *Attorney, Agent, or Firm*—Thomas Rouse; Charles D. Brown; Donald C. Kordich

(57) ABSTRACT

An in-bound directed telephone station, and a method of directing a telephone station based on an in-bound call, are disclosed. The inbound directed telephone station includes a handset having a call receiver and a call originator, a first memory location, coupled to the call receiver, and a comparator coupled to the first memory location and to the call receiver. Upon receipt of an inbound call by the call receiver, the comparator compares an identifier of the in-bound call to an identifier list in the first memory location and terminates receipt of the in-bound call by the call receiver. Upon locating a match between the identifier list and the identifier of the in-bound call, the comparator automatically activates the call originator to perform a function associated with the in-bound call identifier. The method includes receiving a call at the telephone, activating an identification system based on the receiving, which identification system identifies the origination of the in-bound communication, associating a function with the in-bound communication based on the origination, terminating the in-bound communication after the activating of the identification system, and automatically performing, by the telephone, of the function associated with the in-bound communication.

12 Claims, 2 Drawing Sheets

IN-BOUND CALL DIRECTED TELEPHONE STATION AND METHOD OF DIRECTING A TELEPHONE STATION BASED ON AN IN-BOUND CALL

RELATED APPLICATIONS

This application claims priority to U.S. Provisional Application No. 60/350,059, filed on Jan. 18, 2002.

BACKGROUND OF THE INVENTION

1. Field of the Invention

The present invention is directed generally to a method and apparatus for directing a telephone station and, more particularly, to an in-bound call directed telephone station and a method of directing a telephone station based on an in-bound call.

2. Description of the Background

Telephone stations, and in particular, cellular telephone stations, normally offer a variety of telephone features. These features may include, for example, return call. However, during normal operation of the telephone, most of such features are accessible only to the person in possession of the telephone, and not to an in-bound caller.

It is known in the art that an in-bound caller can call a telephone station and access messages, or change the manner of receiving messages. However, such accessing is passive, and does not require any action on the part of the telephone station being called to change its function. Further, such accessing is based on information entered during the call, after the telephone station has answered the call, rather than the information of the in-bound call itself. Thus, in order to activate a feature of the telephone, such as return call, from a remote location using the prior art, the telephone would have to actively change its function by answering the call, thereby interrupting operation of the telephone, and receiving information entered by the remote caller.

Therefore, the need exists for a telephone station and method that offers remote access to change the features of the telephone station based on information contained in the origination of an in-bound call.

BRIEF SUMMARY OF THE INVENTION

The present invention is directed to an in-bound call directed telephone station. The inbound directed telephone station includes a handset having a call receiver and a call originator, a first memory location, coupled to the call receiver, and a comparator coupled to the first memory location and to the call receiver. The handset is preferably a cellular telephone handset. Upon receipt of an inbound call by the call receiver, the comparator compares an identifier of the in-bound call to an identifier list in the first memory location and terminates receipt of the in-bound call by the call receiver. The in-bound call is preferably a page, which page does not interrupt operation of the telephone. Upon locating a match between the identifier list and the identifier of the in-bound call, the comparator automatically activates the call originator to perform a function associated with the in-bound call identifier.

The present invention also includes a method of directing a telephone, based on an in-bound call. The method includes receiving a call at the telephone, activating an identification system based on the receiving, which identification system identifies the origination of the in-bound communication, associating a function with the in-bound communication based on the origination, terminating the in-bound communication after the activating of the identification system, and automatically performing, by the telephone, of the function associated with the in-bound communication.

The present invention solves problems experienced with the prior art because the accessing of functions is based on the information of receipt of the in-bound call. Thus, the telephone need not actively change its function by answering the call, thereby interrupting operation of the telephone. Therefore, the present invention provides a telephone station and method that offers remote access to change the features of the telephone station based on information contained in the origination of an in-bound call. Those and other advantages and benefits of the present invention will become apparent from the detailed description of the invention herein below.

BRIEF DESCRIPTION OF THE SEVERAL VIEWS OF THE DRAWING

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical telephone station. Those of ordinary skill in the art will recognize that other elements are desirable and/or required in order to implement the present invention. However, because such elements are well known in the art, and because they do not facilitate a better understanding of the present invention, a discussion of such elements is not provided herein. Furthermore, as used herein the term "call" is used to mean a conventional audio telephone call, a data exchange call, such as a facsimile exchange, and a page call, whereby information is exchanged using a page as is known in the art, unless otherwise specified herein.

Figure 1:
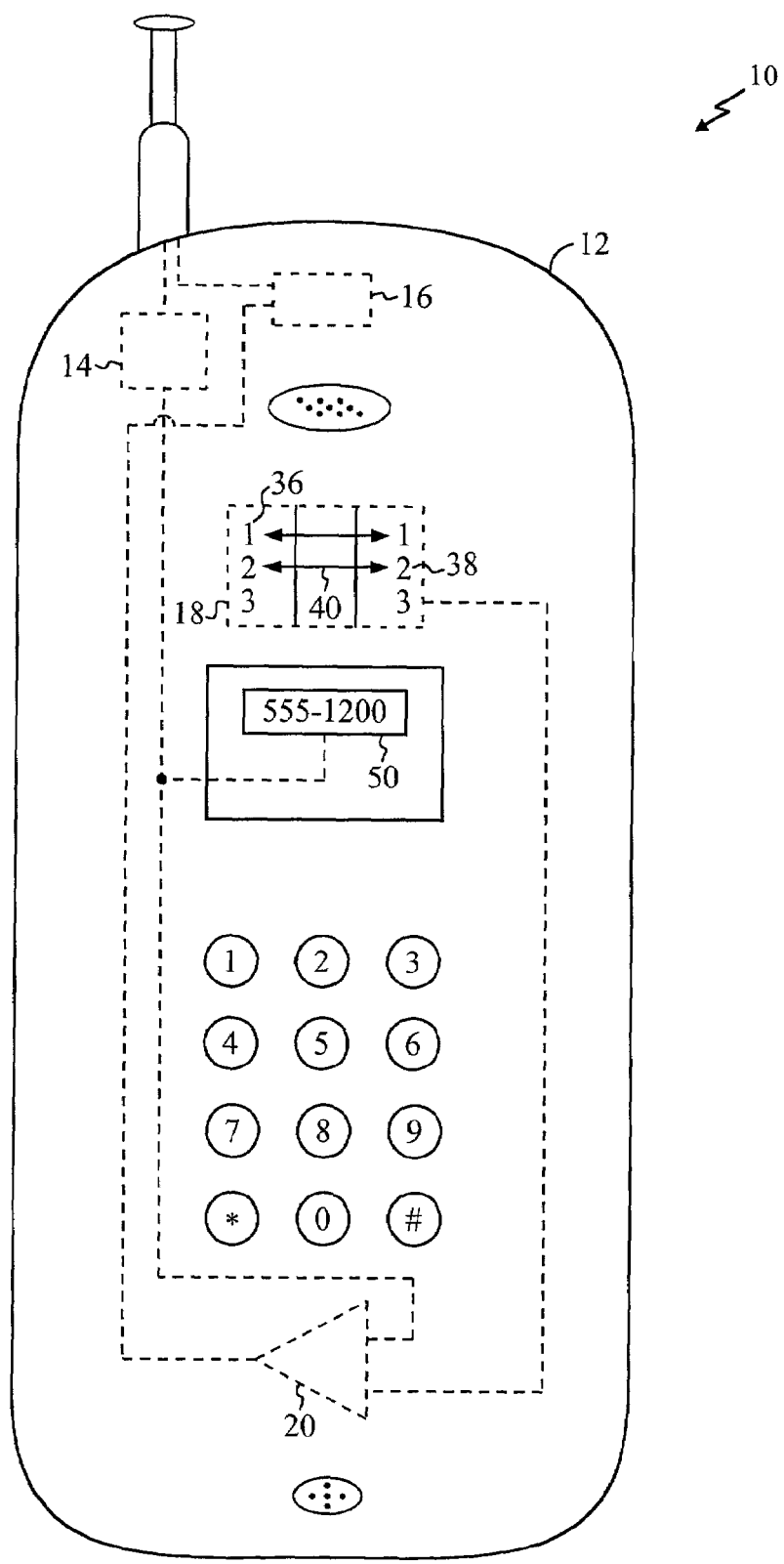
FIG. 1 is an in-bound call directed telephone station.

FIG. 1 is an in-bound call directed telephone station 10. The in-bound call directed telephone station 10 includes a handset 12 having a call receiver 14 and a call originator 16, a first memory location 18, and a comparator 20. In a preferred embodiment, the in-bound call is a page to the telephone station 10.

The handset 12 includes a call receiver 14 and a call originator 16. The telephone station 10 of the present invention is preferably a mobile telephone station, and the handset 12 is a cellular telephone handset, such as those known in the art. In this preferred embodiment, the call receiver 14 is a cellular telephone receiver within the handset 12, and the call originator 16 is a cellular telephone call originator within the cellular handset 12.

The first memory location 18 is coupled to the call receiver 14. The first memory location 18 is preferably built into the handset 12. In an alternative embodiment, the first memory location 18 is mounted externally to the handset 12, and coupled to the call receiver 14 within the handset 12. The first memory location 18 may be a digital memory device, such as a random access memory, or an analog memory device. The first memory location 18 must be of an adequate memory size to record therein information necessary to practice the present invention, such as information on a list of identified incoming telephone numbers, and a list of telephone operations and functions that correspond to each number on the identified list. The first memory location 18 preferably includes therein a list of identifiers 36 for incoming calls, a list of functions 38 that may be performed by the telephone 10, and an association 40 of each number on the identifier list to at least one function. The identifier list 36, in one embodiment, is a list of telephone numbers that regularly are encountered as the origin of incoming calls to the telephone station 10. The identifier list 36 may be entered by a user of the telephone, or may be automatically maintained by the telephone 10 as a recall list of previously received calls.

The comparator 20 is coupled to the first memory location 18 and to the call receiver 14. The comparator 20 is a device, such as those known in the art, used for comparing one set of data to another, and outputting a signal where there exists a match between the compared data. The comparator 20 may be, for example, a digital comparator or an analog comparator. More specifically, the comparator 20 may be, for example, a programmable logic controller or a central processing unit.

When an inbound call, such as a page, is received by the call receiver 14, the comparator 20 is activated. The comparator 20 compares an identifier 50 of the in-bound call to the identifier list 36 stored in the first memory location 18. The identifier 50 is, in one embodiment, the incoming telephone number. The identifier 50 may also be a code encoded into the incoming call signal. For example, the code may be a password that, upon receipt by the telephone station 10, grants the caller access to the functions and modes of the telephone station 10. In another embodiment, the identifier 50 is a voice mail. Upon receipt of the in-bound call, the call is forwarded to voice mail by the telephone station 10, and the voice on the voice mail may be recognized, or a password spoken by the caller may be recognized, by the telephone station 10 which, upon recognition, grants access to the functions 38 or modes of the telephone station 10 to the caller. Additionally, activation of the comparator 20 terminates receipt of the in-bound call by the call receiver 14.

When the comparator 20 finds a match between the incoming call identifier 50 and the identifier list 36, a signal is output by the comparator 20 to the call originator 16 of the handset 12 that causes the function 38 associated 40 with the particular identifier 50 in the identifier list 36 to be performed. In a preferred embodiment, the function 38 includes making a new call to the origination number of the identified in-bound call. This is the direct return call function. In the embodiment wherein the incoming call is a page, the user of the telephone station 10 can use the telephone 10 on a first call while receiving the second call in the form of a page, and the telephone 10 can activate the direct return call when that first call is completed. Alternatively, the function 38 may include changing the operating mode of the telephone 10. For example, the telephone 10 may switch to receive only mode, or may allow the user to access only certain numbers or area codes on outgoing calls. In another alternative embodiment, the function 38 includes associating a new function with the identified in-bound number. For example, the in-bound call may cause the telephone 10 to associate a new function, such as call-waiting block, with the identifier 50 of the in-bound call in the identifier list 36 in the memory location 18, where the identifier 50 previously had a different function 38 associated 40 with it in the identifier list 36. In this embodiment, the identifier 50 of the in-bound call contains control information that causes the new association to be formed, such as an access code, as discussed hereinabove. In yet another alternative embodiment, the function 38 includes creating a new entry in the identifier list 36 in the memory location 18. In yet another alternative embodiment, the function includes the originating of a new call by the telephone station 10 to a third party (not the in-bound number). The function 38 may include numerous different operations, such as those discussed hereinabove, or one operation. Further, as a portion of the function 38, a mobile telephone station 10 may contact a base station associated with the location of the mobile telephone station 10, in order to verify the in-bound number before performing the remainder of the function 38.

Figure 2:
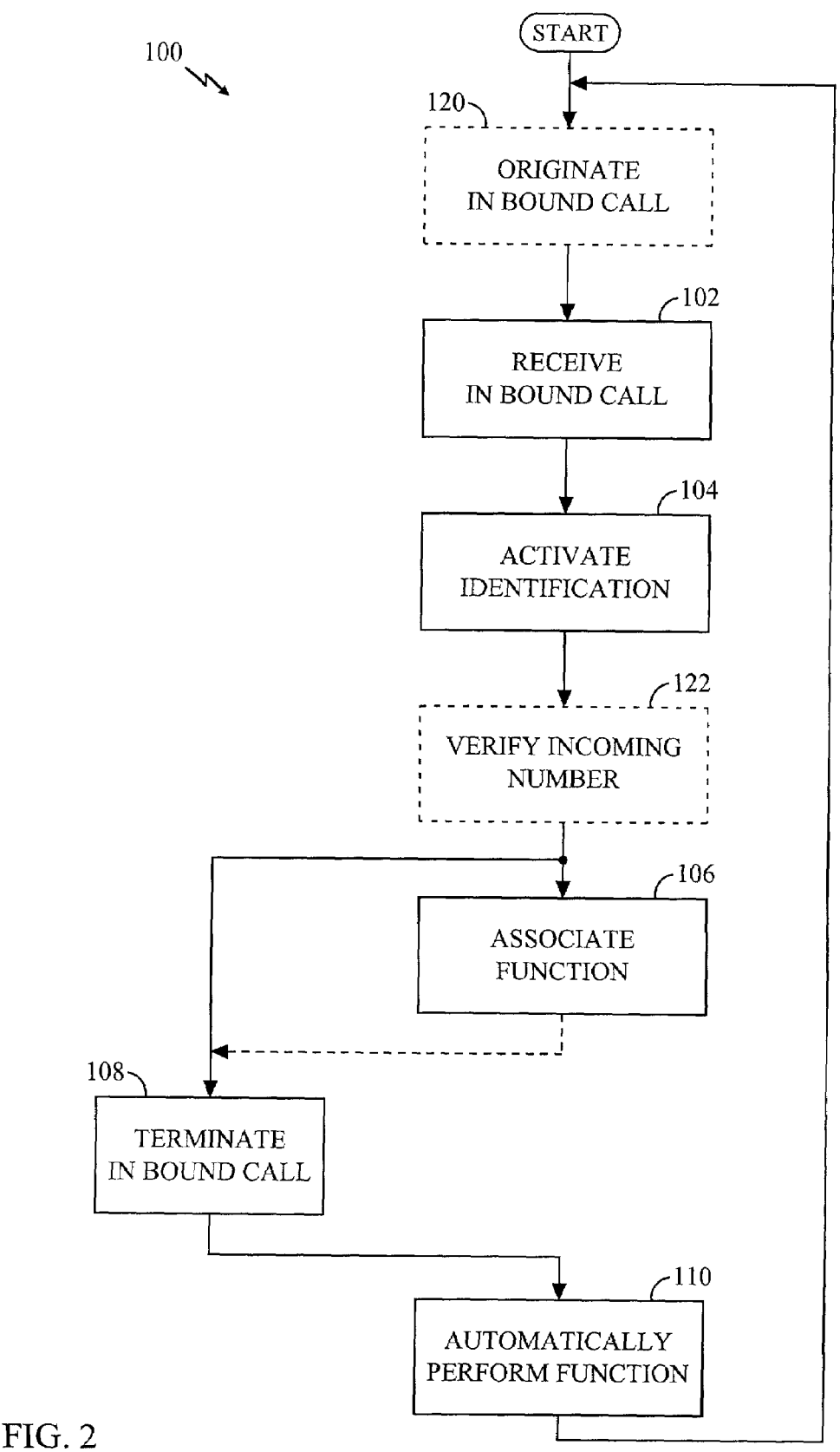
FIG. 2 is a flow diagram illustrating a method of directing a telephone based on an in-bound call.

FIG. 2 is a flow diagram illustrating a method 100 of directing a telephone based on an in-bound call. The method 100 includes the step 102 of receiving a call at the telephone, the step 104 of activating an identification system for the in-bound call, the step 106 of associating a function with the in-bound call, the step 108 of terminating the in-bound communication after the step of activating, and the step 110 of automatically performing the function associated with the in-bound call.

At step 102, an incoming call is received at the telephone station. The telephone station is preferably a mobile telephone station. The call is originated at a remote user station, as is shown in step 120.

At step 104, an identification system is activated based on the receipt of the in-bound call. The identification system identifies the origination of the in-bound communication. In one embodiment, the identification system is a caller ID system, as is known in the art. In another embodiment, the identification system is a voice mail receiver. The voice mail receiver then uses voice recognition, as discussed hereinabove, or the entry of a numeric code, to identify the originator of the incoming call. Further, the identification system may include contacting a base station in contact with the telephone to verify the veracity of the incoming number, at step 122.

At step 106, a function is associated with the in-bound communication based on the origination. The function may be, for example, the telephone station making a new call to the origination, the telephone station changing operating modes, or the telephone station making a new call to a third party. The association of the function occurs based on the correlation between the incoming number, and a number in an identifier list stored in a memory location of the telephone station. Each number on the identifier list has a function associated with it. A comparator compares the identifier of the in-bound call to the identifier list stored in the memory location. The identifier may be the incoming telephone number. The identifier may also be a code encoded into the incoming call signal, or a voice mail, as discussed hereinabove with respect to FIG. 1. When the comparator finds a match between the incoming call identifier and the identifier list, a signal is output by the comparator to the handset that causes the function associated with the particular identifier in the identifier list to be performed.

At step 108, the in-bound call is terminated after the activation of the identification system. This terminating step 108 may occur before or after the function is associated with the in-bound call, as long as the information necessary for the identification has been received. The terminating step 108 may be performed by the telephone station, by hanging up on the in-bound call, or may be performed by the in-bound call hanging up.

At step 110, the function associated with the in-bound call is automatically performed. The performing step 110 may be an originating of a return call by the telephone station to the identified number, an originating of a return call by the telephone station to a number stored in a memory as corresponding to the identified number, or a forming of a new association of a function with the origination. The forming of a new association may be based, for example, on control information included in the identification of the in-bound call. The step 110 of performing a function may also include entering a new operating mode. The new operating mode may be, for example, normal mode, receive-only mode, caller log mode, in-bound caller log mode, or special function mode. Normal mode would be the operation of the telephone station as is known in the art, receiving and sending calls. Receive only mode would not allow the origination of call from the telephone station, but would allow receipt of calls. Caller log mode would allow normal operation, but would keep a log of all outgoing numbers dialed from the telephone station. In-bound caller log mode would allow normal operation, but would keep a record of all incoming numbers. Special function modes would be other operating modes, such as internet mode.

Those of ordinary skill in the art will recognize that many modifications and variations of the present invention may be implemented. The foregoing description and the following claims are intended to cover all such modifications and variations.

What is claimed is:

1. An in-bound call directed telephone station, comprising:
    a handset having a call receiver and a call originator;
    a first memory location, coupled to the call receiver;
    a comparator, coupled to said first memory location and to the call receiver;
    wherein, upon receipt of an inbound call by the call receiver and before the call receiver answers the in-bound call, said comparator compares an identifier of the in-bound call to an identifier list in said first memory location and terminates receipt of the in-bound call by the call receiver; and
    wherein, upon locating a match between the identifier list and the identifier of the in-bound call, said comparator automatically activates the call originator to perform a function associated with the in-bound call identifier;
    wherein the fraction is making a new call to a number of the identified in-bound call.

2. An in-bound call directed telephone station, comprising:
    a handset having a call receiver and a call originator;
    a first memory location, coupled to the call receiver;
    a comparator, coupled to said first memory location and to the call receiver;
    wherein, upon receipt of an inbound call by the call receiver and before the call receiver answers the in-bound call, said comparator compares an identifier of the in-bound call to an identifier list in said first memory location and terminates receipt of the in-bound call by the call receiver; and
    wherein, upon locating a match between the identifier list and the identifier of the in-bound call, said comparator automatically activates the call originator to perform a function associated with the in-bound call identifier;
    wherein the function is changing the operation mode of the telephone station.

3. The in-bound call directed telephone station of claim 1 wherein the operation mode of the telephone station is changed to receive only mode.

4. An in-bound call directed telephone station, comprising:
    a handset having a call receiver and a call originator;
    a first memory location, coupled to the call receiver;
    a comparator, coupled to said first memory location and to the call receiver;
    wherein, upon receipt of an inbound call by the call receiver and without interrupting operation of the telephone station, said comparator compares an identifier of the in-bound call to an identifier list in said first memory location and terminates receipt of the in-bound call by the call receiver; and
    wherein, upon locating a match between the identifier list and the identifier of the in-bound call, said comparator automatically activates the call originator to perform a function associated with the in-bound call identifier;
    wherein the function is associating a new function with the identified in-bound number;
    wherein the identifier contains control information that causes the new association to be formed.

5. An in-bound call directed telephone station, comprising:
    a handset having a call receiver and a call originator;
    a first memory location, coupled to the call receiver;
    a comparator, coupled to said first memory location and to the call receiver;
    wherein, upon receipt of an inbound call by the call receiver and before the call receiver answers the in-bound call, said comparator compares an identifier of the in-bound call to an identifier list in said first memory location and terminates receipt of the in-bound call by the call receiver; and
    wherein, upon locating a march between the identifier list and the identifier of the in-bound call, said comparator automatically activates the call originator to perform a function associated with the in-bound call identifier;
    wherein the telephone station contacts a base station to verify the in-bound number before performing the function.

6. A method of directing a telephone, based on an in-bound call, comprising:
    receiving a call at the telephone;
    activating an identification system based on said receiving, which identification system identifies an origination of the in-bound communication;
    associating a function with the in-bound communication based on the origination; terminating the in-bound communication at the telephone after said activating and before the call receiver answers the in-bound call, automatically performing, by the telephone, of the function associated with the in bound communication;
    further comprising originating the call that is received at the telephone at a remote user station.

7. A method of directing a telephone, based on an in-bound call, comprising:
    receiving a call at the telephone;
    activating an identification system based on said receiving, which identification system identifies an origination of the in-bound communication;
    associating a function with the in-bound communication based on the origination; terminating the in-bound communication at the telephone after said activating and before answering the in-bound call;

automatically performing, by the telephone, of the function associated with the in-bound communication;

wherein said automatically performing comprises originating of a return call by the telephone to the identified number.

8. A method of directing a telephone, based on an in-bound call, comprising:

receiving a call at the telephone;

activating an identification system based on said receiving, which identification system identifies an origination of the in-bound communication;

associating a function with the in-bound communication based on the origination;

terminating the in-bound communication at the telephone after said activating and before answering the in-bound call;

automatically performing, by the telephone, of the function associated with the in-bound communication;

wherein said automatically performing comprises originating of a return call by the telephone to a number stored in a memory as corresponding to the identified number.

9. A method of directing a telephone, based on an in-bound call, comprising:

receiving a call at the telephone;

activating an identification system based on said receiving, which identification system identifies an origination of the in-bound communication;

associating a function with the in-bound communication based on the origination;

terminating the in-bound communication at the telephone after said activating and before answering the in-bound call;

automatically performing, by the telephone, of the function associated with the in-bound communication;

wherein said automatically performing comprises forming a new association of a new function with the origination, said forming being based on control information included in the identification of the in-bound call.

10. A method of directing a telephone, based on an in-bound call, comprising:

receiving a call at the telephone;

activating an identification system based on said receiving, which identification system identifies an origination of the in-bound communication;

associating a function with the in-bound communication based on the origination;

terminating the in-bound communication at the telephone after said activating and before answering the in-bound call;

automatically performing, by the telephone, of the function associated with the in-bound communication;

wherein the function comprises making a new call to the origination.

11. A method of directing a telephone, based on an in-bound call, comprising:

receiving a call at the telephone;

activating an identification system based on said receiving, which identification system identifies an origination of the in-bound communication;

associating a function with the in-bound communication based on the origination;

terminating the in-bound communication at the telephone after said activating and before answering the in-bound call;

automatically performing, by the telephone, of the function associated with the in bound communication;

wherein the function comprises making a new call to a third party.

12. A method of directing a telephone, based on an in-bound call, comprising:

receiving a call at the telephone;

activating an identification system based on said receiving, which identification system identifies an origination of the in-bound communication;

associating a function with the in-bound communication based on the origination;

terminating the in-bound communication at the telephone after said activating and before answering the in-bound call;

automatically performing, by the telephone, of the function associated with the in-bound communication;

wherein the telephone is a mobile telephone station;

wherein said activating an identification system comprises contacting a base station in contact with the telephone to verify the veracity of the incoming number.

* * * * *